Aug. 22, 1933.  J. H. HUNT ET AL  1,923,380
SYNCHRONIZING CLUTCH MECHANISM FOR AUTOMOBILE TRANSMISSIONS
Filed Feb. 23, 1932  3 Sheets-Sheet 1

Inventors
John H. Hunt &
Olaf Rasmussen
By Blackmore, Spencer & Flint
Attorneys

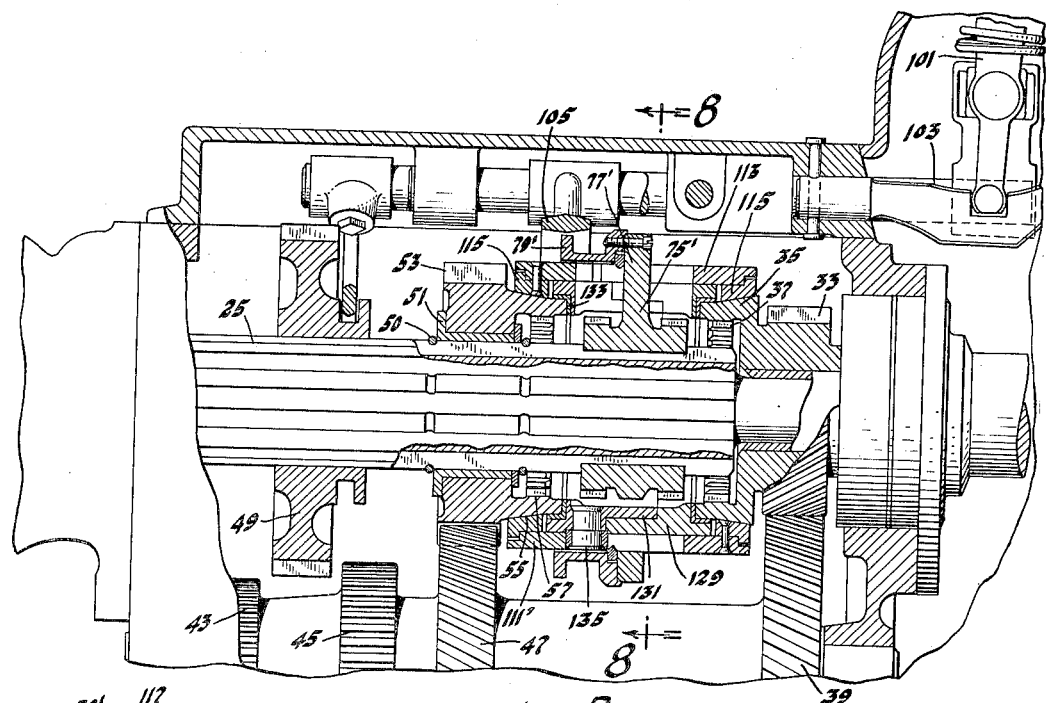

Aug. 22, 1933.  J. H. HUNT ET AL  1,923,380
SYNCHRONIZING CLUTCH MECHANISM FOR AUTOMOBILE TRANSMISSIONS
Filed Feb. 23, 1932   3 Sheets-Sheet 3
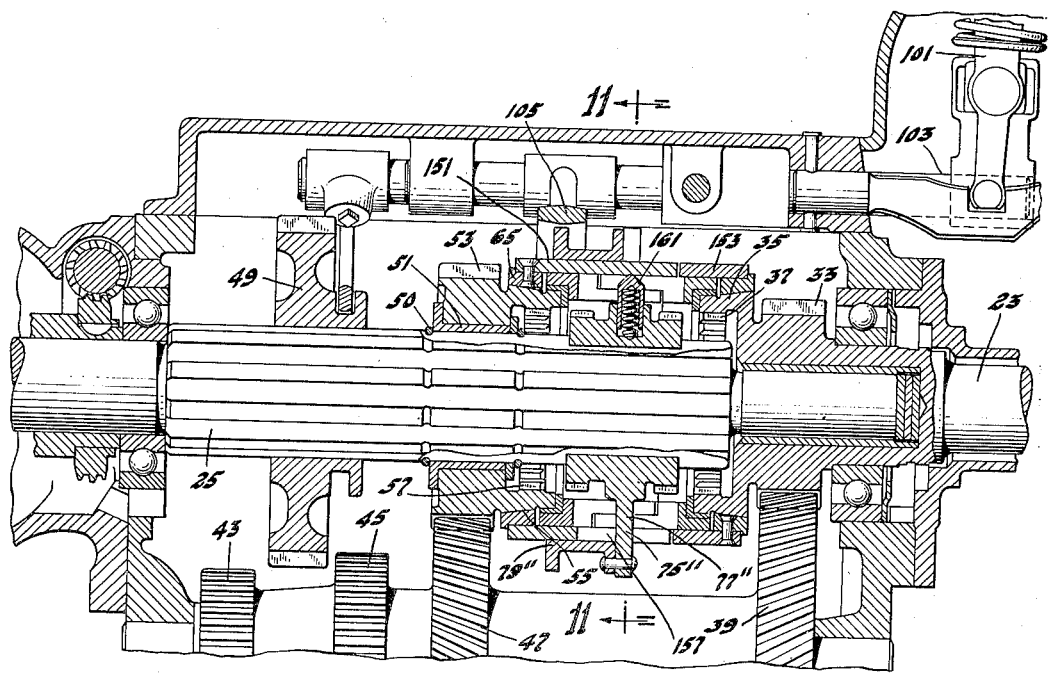
Fig. 10
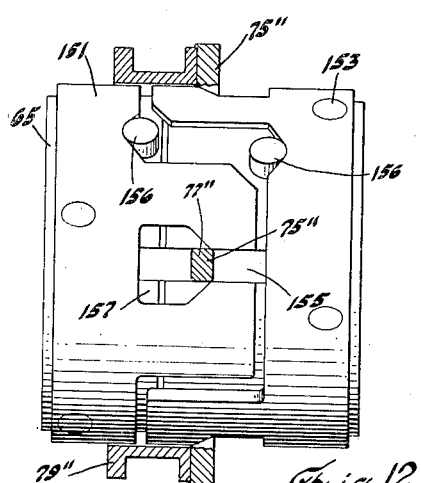
Fig. 12
Fig. 13
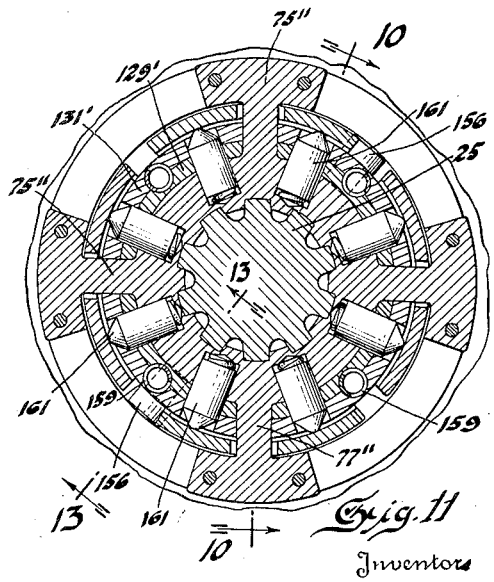
Fig. 11
Inventors
John H. Hunt &
Olaf Rasmussen
By Blackmore, Spencer & Hunt
Attorneys Patented Aug. 22, 1933

1,923,380

UNITED STATES PATENT OFFICE 1,923,380

SYNCHRONIZING CLUTCH MECHANISM FOR AUTOMOBILE TRANSMISSIONS

John H. Hunt and Olaf Rasmussen, Detroit, Mich.

Application February 23, 1932. Serial No. 594,506

12 Claims. (Cl. 192—53)

This invention relates to synchronizing transmission mechanism employing sequentially-acting friction and jaw clutches, and has been particularly designed for use on motor vehicles.

It is an object of the invention to provide such a transmission with self-energizing mechanism to automatically effect engagement of the friction clutch elements before the engagement of the jaw teeth.

A further object is to provide against jamming while in operation.

As another object the invention aims to ensure the restoration to inoperative position of the parts effective to produce self-energization prior to the movement of the sliding jaw clutch element into its neutral position.

The invention contemplates mechanism to be associated with an elastic drive in connection with the friction clutch to facilitate the engagement of the jaw teeth.

The invention also contemplates the use of mechanism to release the self-energizing device which actuates the friction clutch prior to the engagement of the jaw teeth.

Other objects and advantages will be understood from the following description.

The invention is illustrated in the accompanying drawings.

In the drawings—

Figs. 1 to 6 inclusive represent a first embodiment of the invention.

Fig. 6 is a diagrammatic view of the clutch teeth.

Figs. 7 to 9 represent a second embodiment of the invention.

Fig. 7 is a longitudinal section through the transmission mechanism, the section being indicated on line 7—7 of Fig. 8.

Fig. 8 is a transverse section on line 8—8 of Fig. 7.

Fig. 9 is a plan view of parts of the device, the view being partly in section.

Figs. 10 to 13 represent a third form of the invention.

Fig. 10 is a longitudinal section with a view corresponding to the line 10—10 of Fig. 11.

Fig. 11 is a section on line 11—11 of Fig. 10.

Fig. 12 is a plan view of a portion of the mechanism, parts being shown in section.

Fig. 13 is a section on line 13—13 of Fig. 11.

Figure 1:
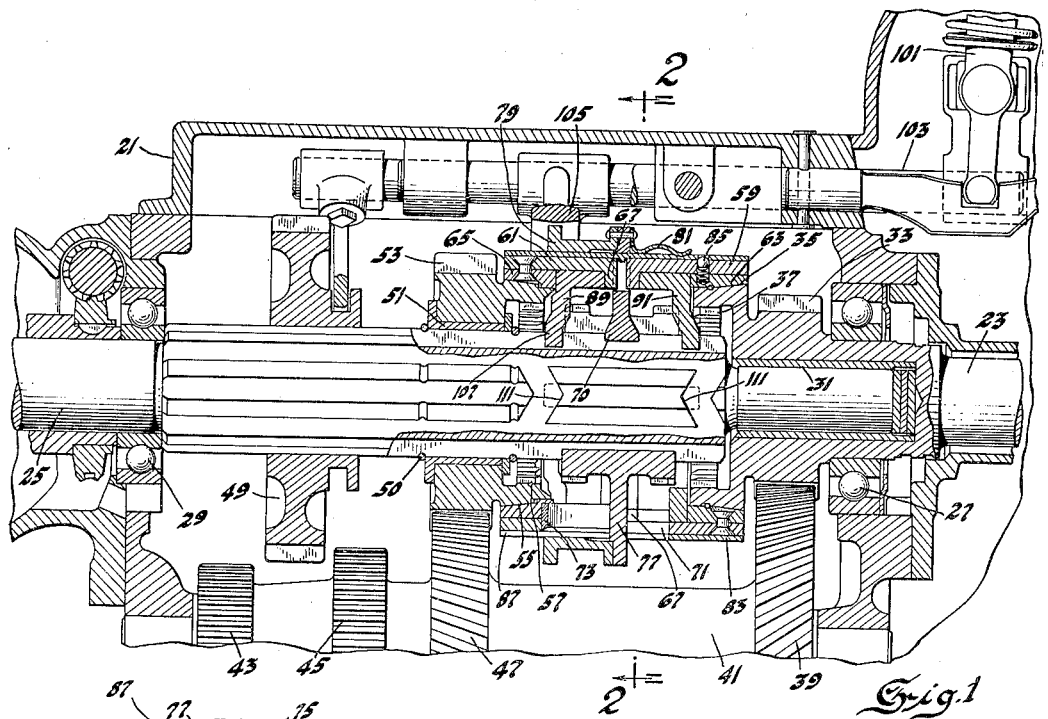
Fig. 1 is a longitudinal sectional view, the view being substantially on line 1—1 of Fig. 2.
Figure 2:
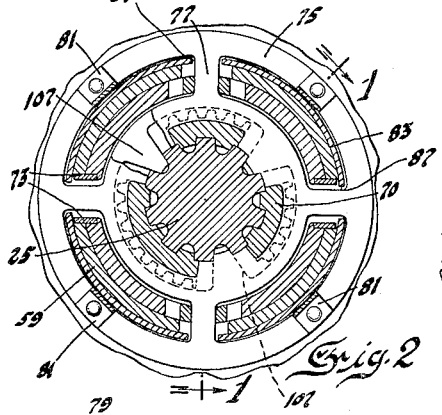
Fig. 2 is a transverse section on line 2—2 of Fig. 1.
Figure 4:
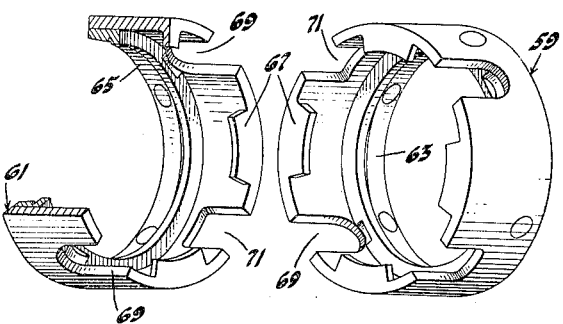
Fig. 4 is a perspective of two movable frictional clutch elements in disassembled relation.

Referring to Figures 1 to 6, it may be explained that these figures show a synchronizing transmission employing successively operating friction and jaw clutches. Such a combination of clutches is now well known and quite generally used to facilitate gear shifting. The figures show a form of self-energizing mechanism to ensure the engagement of the friction clutch elements when the slidable jaw clutch member is moved. Some forms of self-energization have heretofore been proposed. With such prior devices it has been found that the ends of the jaw teeth, as they approach after synchronization has been effected by the friction clutch elements, may start to engage in such a way as to tend to force the frictional clutch faces together, thus making complete meshing of the jaw teeth very difficult or even impossible.

In this form of the invention there is contemplated the use of resilient means between the movable one of the friction clutch elements and the movable jaw clutch element whereby, without any release of the friction clutch, the jaw teeth may properly engage. The use of spring means in this relation may be attended with some difficulty. It has been found that the springs in such an elastic connection cannot be made strong enough to rotate the countershaft as they would be required to when synchronizing for second speed, and also have the necessary flexibility to permit easy engagement of the jaw teeth when they start to engage from positions of misalignment. This first solution of the problem adopts, as a compromise, a spring which is stiff enough to rotate the countershaft, provided there be not too much resistance, as where the oil is not abnormally thick. To provide for the condition where the oil is very thick a modified shape of tooth is relied on. These teeth are given a taper on one side only so that the axially applied pressure will tend to produce that direction of rotation of the driven toothed element which would facilitate the entry of the driving teeth between the driven teeth. The invention will be better understood from a detailed description.

In these figures 21 represents the housing of a transmission, and 23 is the input shaft. The shaft 25 is the output or spline shaft. Shaft 23 is rotatably supported in the front wall of the housing by bearings 27. Bearings 29 rotatably support the spline shaft in the rear wall of the housing. At 31 is a bearing for the reduced end of the spline shaft in the recessed end of the driving shaft, this being the usual construction. At 33 is the driving gear of the constant mesh train on the driving shaft 23. Numeral 35 is used to designate a conical friction surface on the extreme end of the driving shaft. Radially within this conical friction surface are internal teeth 37.

Figure 3:
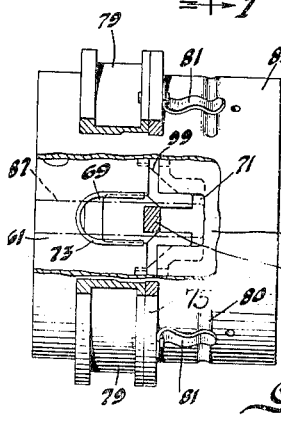
Fig. 3 is a plan view of a portion of the mechanism partly broken away and parts being shown in section.
Figure 5:
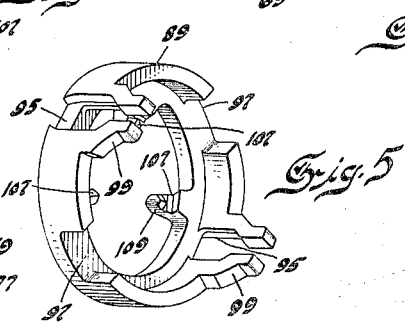
Fig. 5 is a perspective of an energizing member.

The driving gear 33 is in constant mesh with gear 39 on the countershaft 41. 43 represents a reverse driving gear also on the countershaft. Gears 45 and 47 are low speed and second speed gears respectively. Gear 49 on the spline shaft is the driven gear for low speed and reverse. Retainers 50 on the spline shaft position a ring 51 to rotatably support the second speed driven gear 53. Axially of and integral with the driven gear 53 there is a conical friction face 55 within which are internal teeth 57. 59 and 61 are sleeves having conical friction members 63 and 65 respectively. These friction members 63 and 65 engage the conical friction surfaces 35 and 55. On the members 59 and 61 at one edge are radial fingers or lugs 67. At 69 and 71 are shown slots cut axially into the faces of members 59 and 61, the slots numbered 69 having a rounded contour at their inner ends. At 75 is shown an outer ring part of a double jaw clutch member. This member is slidably splined on the shaft having an inner toothed ring 70 for this purpose. From the central plane of the toothed inner ring there extend on either side thereof spaced segmental parts formed with clutch teeth as shown in Fig. 1. There are thus axial slots between the segmental parts. By this means the double clutch member may slide axially, the slots receiving therein the arms 107 of the energizing sleeves 89 and 91. Extending radially outward from the parts of the double clutch member thus far described are arms 77 uniting with the outer ring 75. These arms 77 extend through slots 69 and 71. To the outer ring 75 of the double clutch member is secured a collar 79 which is to be engaged by a conventional shifting fork. Also, to the outer ends of the arms 77 there are secured spring members 81 which engage the outer surface of the drum 83 whereby the drum is constrained to reciprocate with the sliding jaw clutch member, at least at the beginning of its sliding movement. A groove 80 is engaged by the free ends of the springs 81 for this purpose. The drum is formed with slots 87 through which the arms 77 project, the slots being dimensioned to correspond with the width of the arms 77. The numeral 85 represents one of a plurality of spring locks whereby the axial movement of the drum may move the friction members 59 and 61 into contact with the cooperating friction members associated with the gears 33 and 53. Energizing sleeves are represented by numerals 89 and 91. The former shown in perspective in Fig. 5. The sleeve 89 is assembled together with sleeve 61 and the sleeve 91 is assembled with sleeve 59. The annular wall portion of each energizing sleeve is located between the friction ring of the clutch sleeve and the inturned flange 67. The circular wall of each energizing sleeve is provided with openings as at 95 and 97. From the edges of openings 95 there are axially extended arms 99 shaped as shown in Fig. 3. The ends of these arms have a space between them corresponding to the transverse dimension of the arm 77 while considerable radial clearance is provided between the arms 77 and the sides of the wider portions of the openings 95. When assembled, the arms 99 on sleeve 89 partially enter the openings 97 on the sleeve 91.

Within the recesses 69 of the friction clutch members 59 and 61 are placed U-shaped springs 73. These springs are of such width as to also occupy the openings 95 of the energizing sleeves, the ends of the arms of the U-shaped spring engaging the inner wall of the opening 95 as shown in Fig. 3. Relative rotary movement between each energizing sleeve and its associated friction sleeve is resiliently resisted by the compression of one or other of the arms of the U-shaped spring 73. Furthermore, such relative rotary movement is limited by the engagement of one of the arms 99 with an end of the flange 67. Each energizing sleeve has one or more inwardly-directed radial fingers 107 extending between the segmental portions 70 of sliding clutch member 75 and having bevelled faces 109 to cooperate with similar faces 111 formed on the splines of the spline shaft whereby rotary motion of the energizing sleeve causes the sleeve to be moved axially and with it the associated friction sleeve to thereby cause the frictional element on the frictional sleeve to firmly contact the cooperating frictional element associated with the respective gear.

The shifting mechanism may be of any preferred kind. There is shown a lever 101 which is merely illustrative of a conventional gear shift lever. This lever is intended to reciprocate a rod 103 which carries a shift fork 105 which is intended to engage and slide the movable jaw clutch member.

The operation of the device is substantially as follows: As the movable jaw clutch member slides to the left, for example, it carries with it at the beginning of its sliding movement by means of springs 81 the barrel 83. The spring locks 85 ensure that the friction clutch elements 59 and 61 are also moved, 59 being moved away from the friction cone associated with gear 33 and 61 being moved such that its clutch element 65 is engaged with the friction cone 55 associated with gear 53. The energizing sleeve 89 is obviously moved axially together with the sleeve 61. The friction clutch functions to synchronize the rotation of the parts carrying jaw teeth after which the movable clutch member 75 is moved axially relative to the barrel, and the parts 61 and 89 and into toothed engagement with the jaw clutch element associated with gear 53. As soon as the arm 77 has moved far enough to escape from between the narrow space between the ends of arms 99, the frictional drag between the rotating cone 55 and the friction ring 61 causes a relative rotation between the ring 61 and the clutch member 75 because the latter is constrained to rotate with the shaft owing to its spline connection therewith. There also may be a relative rotation between the friction sleeve 61 and the energizing ring 89 if the force is such as to cause the spring 73 to yield. The resulting rotation of the energizing sleeve 89 and the cam 109 relative to the spline shaft cam causes the sleeve to be thrust axially and to effect a firm engagement of the frictional clutch elements. If there is but little relative rotation to be overcome by the frictional clutch, the spring 73 may prevent relative movement between the parts 89 and 61. If on the other hand the force is considerable as where the oil is viscous, the spring 73 is deflected whereupon relative rotation occurs between the sleeves 89 and 61, the engagement of 99 with lug 67 constituting a limit to any such relative rotation. The teeth of the jaw clutch are chamfered on the proper side—on one side only—to prevent any jamming action between the positive jaw clutch member and the energizing cam. The chamfered teeth are so formed that under the condition just stated they tend to cam the arm 99 away from the lug 67. Otherwise it would be impossible to engage the jaw clutch teeth. The proper chamfer of the teeth as shown by Fig. 6 facilitates the meshing of the teeth and avoids the difficulty above mentioned. As the sliding jaw clutch member returns to its neutral position it must again enter the narrow region between the arms 99. When shifting from first to second very rapidly the spring 73 will be flexed momentarily in an opposite direction, but as soon as synchronization is completed the spring 73 will be reversely flexed and the action will be as described above. This will ensure the release of the energizing cam device and prevent any possibility of one friction clutch being held in engaged position when attempting to effect energization of the opposite friction clutch. Clashing of the jaw teeth is thus avoided.

There is therefore inherent in the structure described above a synchronizing transmission employing successively operating friction elements and jaw teeth; there is provided means for energizing the friction clutch and yielding means to facilitate the engagement of the jaw teeth. There is also provided a jaw tooth which is designed to cooperate with the aforesaid yielding means to facilitate the operation of the clutch. There is also provided what may be called a recentralizing device by which, when the jaw clutch member returns to its neutral position regardless of whether or not the jaw teeth have been brought into engagement, the energizing device may be rendered inoperative.

In Figs. 7, 8, and 9 there is shown an embodiment of the invention in which the defective features of said prior device are overcome in a somewhat different manner. In this form of the invention there is used a different type of energizing device and in place of a yielding means to facilitate jaw tooth engagement there is provided positive means to release the cam energizing mechanism for actuating the friction clutch prior to the jaw tooth engagement. In this form also there is employed the known inertia check device whereby the jaw teeth are prevented from engaging until synchronization is completed by the friction clutch. There is also the recentralizing expedient to ensure the release of the energizing device prior to the movement of the jaw clutch member to its neutral position. In this form of the invention there may be used either conventional chamfered teeth or, if preferred, teeth chamfered as shown by Fig. 6.

Similar reference characters are used to designate the parts in these figures which are common to Figs. 1 to 6.

The slidable double clutch member is designated at 75'. It is splined on the shaft 25 and has arms 77' to the ends of which is secured a collar 79' for operation by the fork 105. Two movable friction clutch sleeves 111' and 113 have friction cones 115 secured thereto. A spring ring 117 carried by the collar 79' enters a groove in the combined members 111', 113 and is operative to move the said members axially at the beginning of the axial movement of the member 75'. The adjacent edges of the members 111' and 113 are defined by a wall which is in part circumferential and in part axial. There is a clearance in the region of the axial wall to permit a limited circumferential movement between the two sleeves 111' and 113. The members 111' and 113 have slots as at 119 for the passage of the arms 77'. The slots have a relatively wide portion 121 with angular walls 120 and 123. The adjacent edges are also cut away as at 125 and 127 to form recesses. Within the combined movable friction clutch elements 111' and 113 are two energizing sleeves 129 and 131. These sleeves are arranged in overlapping relation as shown in Figs. 7 and 8. These sleeves 129 and 131 have bearing surfaces as at 133 engaging the ends and also cylindrical surfaces adjacent the conical friction members 35 and 55. They have slots registering with slot 119 but lacking the enlarged regions 121. They carry pins 135 which project into the recesses of walls 111' and 113 as shown in Fig. 9. The two members 129 and 131 may be held on their respective bearing surfaces by a spring 159 as shown in the form of the invention yet to be described and illustrated in Fig. 13.

As the member 75' moves axially (to the left, for example) it first carries the double friction clutch sleeve device 111' and 113 with it causing the friction surfaces 115 and 55 to engage. As soon as the arm 77' is within the wider region 121 a relative rotation of sleeve 111' and the sliding jaw clutch member is possible. The unequal rotation of the parts then causes a relative rotation of sleeve 111' and the jaw clutch element. Inasmuch as the energizing sleeve carrying the pins 135 has no movement of rotation relative to the sliding jaw clutch element, the rotation of 111' relative to 75' may be said to be also relative to the energizing ring carrying the pins. As a result of this relative rotation the pins travel on the cam surfaces on one or the other of the sides of the recess and cause an axial thrust to be delivered to the friction sleeve 111' and its firm contact with the friction cone 55. When synchronization has been effected by the friction clutch the jaw clutch is to be further moved into engagement with the teeth 57. The arm 77' then slides along the inclined wall 120 of the wider space 121 to enter the narrow space as the jaw teeth approach engagement. Since there is no relative rotation between the member 75' and the member 131 which carries the roller 135, the axial movement of 77' from the wider region 121 restores the ring 111' to its former position in which the roller 135 is in the deep part of the recess. The energizing device applied to the friction clutch is thus relieved. Furthermore, if it be attempted to engage the jaw teeth before synchronization, the resistance between the arm 77' and the wall 120 serves to prevent such action. This resistance is what is generally known as the inertia check device.

This second form of the invention therefore provides an inertia check device which ensures synchronization prior to the engagement of the jaw teeth. It also embodies the energized frictional synchronizing clutch. It ensures the release of the energizing means prior to the jaw tooth engagement, and it also provides for the release of the energizing device before the movement of the jaw tooth member into neutral position.

Figs. 10, 11, 12, and 13 represent an intermediate stage in the development, these figures containing some of the features of the first form and some of the features of the second form. The same reference characters are applied to the principal parts of the transmission as were used for the forms already described.

The slidable double clutch member 75″ is connected to the collar 79″ and actuated by the fork 105 as before. Parts 151 and 153 correspond in general to the parts 111′ and 113 of Fig. 9. Each of these parts has a slot 155 of a width corresponding to the width of the radial arm of the sliding jaw clutch member and also a wider portion as shown at 157. In this form of the invention the wider portion has angular walls at one end only. It does not have angular walls at the other end which were designed to provide the inertia check of the second form of the invention. As stated the radial arms 77″ pass through the slots 155 and 157 and they also pass through registering slots in the overlapping energizing sleeves 129′ and 131′. The slots in these energizing members do not have the wider portions corresponding to 157. These energizing members are provided with pins 156 which enter the recesses of the members 151 and 153. The recesses have angular walls whereby the relative rotation causes the axial movement and the energization of the friction clutches as before. The members 129′ and 131′ are rotatably supported on the cylindrical ends of the friction cone faces 35 and 55 by suitable bearings, plain bearings being shown. The parts 129′ and 131′ may be held in position on the cylindrical surfaces by coil springs 159 therebetween. The initial movement of the members 151 and 153 is made by a plurality of spring detents 161 slidable radially in member 75″ and pressed against the inner surface of the members 151 and 153.

In this form of the invention when the double jaw clutch member is moved axially, to the left for example, it carries with it at the beginning of its movement the rings 151 and 153 owing to the presence of the spring detents. In so moving the arms 77′ move in the slots 155 in the members 151 and 153 and in the corresponding slots of parts 129′ and 131′. These arms 77″ move from the narrow region 155 to the wider region 157 of the friction clutch sleeves as the movable jaw clutch member slides. Rotation of the cone clutch element on gear 53 tends to carry clutch element 151 around with it at a rate of rotation unlike that of shaft 25. Since the clutch member 75″ is splined to the shaft and since the double sleeves 129′ and 131′ have no rotation relative to 75″, the rotation of part 151 causes the pins 156 to cam the ring 151 into firm frictional contact with its cooperating cone. In this form of the invention reliance is placed upon the energization to ensure synchronization prior to the engagement of the jaw teeth without the use of an inertia check device as shown in the second form of the invention. Nevertheless the sloping wall between the wider part 157 and the narrower part 155 of the slot and member 151 ensures, as before, the release of the energizing mechanism prior to the restoration of the jaw clutch element to its neutral position. In this form of the invention the teeth shown by Fig. 6 should be used because there is no provision for deenergizing the energizing means prior to the engagement of the jaw teeth.

This last characteristic of the third form of the invention is common to the three forms and is believed to provide a very important improvement over prior devices.

We claim:

1. In a synchronizing transmission combining friction clutch elements and jaw clutch elements, energizing means for said friction clutch elements actuated by an approaching movement of the jaw clutch elements, and positively acting means to de-energize said energizing means and actuated by a movement of separation of said jaw clutch elements.

2. The invention defined by claim 1, said means to de-energize comprising a member movable with one of said friction clutch elements, said movable member having an angular face and said movable jaw clutch element having a part engaging said angular face to rotate said movable member and release said energizing means.

3. In a synchronizing transmission, a friction clutch and a jaw clutch each having a movable element, a spline shaft upon which the movable jaw clutch element is slidably mounted, means to resiliently transmit the initial movement of the slidable jaw clutch element to the movable friction clutch element, a yielding mechanism to permit relative rotary movement between the movable friction clutch element and the sliding jaw clutch element, the teeth of the jaw clutch elements being chamfered on one side only.

4. The invention defined by claim 3, said yielding connection including an energizing sleeve, a spring carried by the movable friction clutch element and engaging said energizing sleeve to resist relative rotary movement therebetween.

5. The invention defined by claim 3, said yielding connection including an energizing sleeve, a spring carried by the movable friction clutch element and engaging said energizing sleeve to resist relative rotary movement therebetween together with means to limit said relative movement.

6. The invention defined by claim 3, said yielding mechanism including energizing means having parts to be engaged by said movable jaw clutch member to de-energize said friction clutch.

7. In a synchronizing transmission, jaw clutch elements, one of which is axially movable, friction clutch elements one of which is axially movable, the other elements being relatively immovable, resilient means whereby the initial movement of the movable jaw clutch element moves the movable friction clutch element, frictional clutch energizing mechanism comprising a sleeve substantially non-rotatably mounted relative to the movable jaw clutch element, cam means having parts carried by said movable friction clutch element and energizing sleeve whereby the movable friction clutch element is moved axially, and mechanism to de-energize said friction clutch, said mechanism actuated by the movement of the movable jaw clutch element into its neutral position.

8. The invention defined by claim 7 together with means constituting an inertia check to prevent the jaw teeth from moving into engagement prior to synchronization.

9. In a synchronizing transmission, a spline shaft, a plurality of combined jaw and friction clutch members, said members axially spaced and each mounted for independent rotation relative to said shaft, a double jaw clutch element slidable on the spline shaft and located between said first mentioned members, a pair of axially movable friction clutch sleeves, means to move said sleeves by the initial movement of the movable jaw clutch element, a pair of energizing sleeves one for energizing each of said friction clutches, there being one of said energizing sleeves engaging each of the first-named members, means between said energizing sleeves operative to receive the axial thrust from one frictional clutch and to transmit the thrust to the opposite one of the first members.

10. The invention defined by claim 9, said thrust-receiving and transmitting means being resilient.

11. In a synchronizing transmission, a spline shaft, a combined friction and jaw clutch member rotatable on said shaft, a jaw clutch element slidable on said spline shaft, a movable friction clutch element, resilient means whereby the initial movement of the movable jaw clutch member may move the movable friction clutch element into contact with said cooperating clutch element, an energizing sleeve mounted within said movable friction clutch element and non-rotatable relative to said movable jaw clutch element, pins radially carried by said energizing sleeve, said movable friction clutch element having cam slots to receive said pins whereby the friction clutch is energized, mechanism forming a part of the movable friction clutch element to de-energize the energizing means when the movable jaw clutch element slides to its neutral position.

12. The invention defined by claim 11 together with an inertia check device to prevent the engagement of the jaw clutch prior to frictional synchronization.

JOHN H. HUNT.
OLAF RASMUSSEN.